United States Patent
Huang et al.

(10) Patent No.: US 12,306,978 B2
(45) Date of Patent: May 20, 2025

(54) TENANT ACCESS PROTECTION VIA AN INTERMEDIARY COMPUTER SYSTEM

(71) Applicant: Ruckus IP Holdings LLC, Claremont, NC (US)

(72) Inventors: Liangyi Huang, Taoyuan (TW); Yao Wen Chang, Taipei (TW)

(73) Assignee: RUCKUS IP HOLDINGS LLC, Claremont, NC (US)

( * ) Notice: Subject to any disclaimer, the term of this patent is extended or adjusted under 35 U.S.C. 154(b) by 207 days.

(21) Appl. No.: 17/992,030

(22) Filed: Nov. 22, 2022

(65) Prior Publication Data

US 2023/0169196 A1    Jun. 1, 2023

Related U.S. Application Data

(60) Provisional application No. 63/283,610, filed on Nov. 29, 2021.

(51) Int. Cl.
*G06F 21/00* (2013.01)
*G06F 21/45* (2013.01)
*G06F 21/62* (2013.01)

(52) U.S. Cl.
CPC ......... *G06F 21/6218* (2013.01); *G06F 21/45* (2013.01)

(58) Field of Classification Search
CPC .............................. G06F 21/6218; G06F 21/45
See application file for complete search history.

(56) References Cited

U.S. PATENT DOCUMENTS

| | | | | |
|---|---|---|---|---|
| 9,992,186 | B1* | 6/2018 | Drozd | H04L 63/102 |
| 10,057,246 | B1* | 8/2018 | Drozd | G06F 21/604 |
| 2015/0381623 | A1* | 12/2015 | Mattson | H04L 63/0892 |
| | | | | 726/4 |

OTHER PUBLICATIONS

Wankhede et al. "Secure and Multi-tenant Hadoop Cluster—An Experience", 2016 2nd International Conference on Green High Performance Computing (ICGHPC), Date of Conference: Feb. 26-27 (Year: 2016).*

* cited by examiner

*Primary Examiner* — Morshed Mehedi
(74) *Attorney, Agent, or Firm* — Steven Stupp

(57) ABSTRACT

During operation, a computer system may receive, from an electronic device, an access request to access a shared network in a multi-tenant system, where the electronic device associated with a tenant in the multi-tenant system. Then, the computer system may identify a second computer system, which may be associated with an MSP of the shared network and that provides authentication and/or authorization to the shared network for users associated with the tenant. Moreover, the computer system may provide, to the second computer system, an authorization request for the electronic device. Next, the computer system may receive, from the second computer system, an authorization response, where the authorization response approves access by the electronic device to the shared network. Furthermore, the computer system may provide, to the electronic device, an access response, where the access response includes information specifying access privileges of the electronic device in the shared network.

17 Claims, 5 Drawing Sheets

TENANT ACCESS PROTECTION VIA AN INTERMEDIARY COMPUTER SYSTEM

CROSS REFERENCE TO RELATED APPLICATIONS

This application claims priority under 35 U.S.C. 119(e) to U.S. Provisional Application Ser. No. 63/283,610, "Tenant Access Protection via an Intermediary Computer System," filed on Nov. 29, 2021, by Liangyi Huang, et al. the contents of which are herein incorporated by reference.

FIELD

The described embodiments relate to techniques for enabling authentication and/or authorization of a tenant to a network by a third party via an intermediary computer system.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

In order to provide access protection, electronic devices are typically authenticated and authorized before they can establish a connection with and use many networks. For example, in many networks, the authentication and authorization is performed by an authentication, authorization and accounting (AAA) server.

In multi-tenant systems, different tenants or partners may access shared network resources, such as a network associated with or provided by a managed service provider (MSP). Typically, the MSP has a AAA server for its customers or users, and the tenants or partners have separate external AAA servers for their customers users. Before accessing the network associated with or provided by the MSP, a customer or a user of a given tenant or partner may be authenticated and authorized by the external AAA server of the given tenant or partner. However, some of prospective tenants or partners may not have their own AAA servers or equivalent capability, which makes it difficult for the MSP to support these prospective tenants or partners while ensuring access protection for the network.

SUMMARY

A computer system that enables authentication and/or authorization is described. This computer system may include an interface circuit that communicates with an electronic device associated with a tenant in a multi-tenant system, and that communicates with a second computer system associated with an MSP of a shared network in the multi-tenant system, where the MSP is different from the tenant. During operation, the computer system receives, associated with the electronic device, an access request to access the shared network. Then, the computer system identifies a second computer system, which provides the authentication and the authorization to the shared network for users associated with the tenant. Moreover, the computer system provides, addressed to the second computer system, an authorization request for the electronic device. Next, the computer system receives, associated with the second computer system, an authorization response, where the authorization response approves access by the electronic device to the shared network. Furthermore, the computer system provides, addressed to the electronic device, an access response, where the access response includes information specifying access privileges of the electronic device in the shared network.

Note that the access request and the authorization request may include login credentials of the electronic device or a user of the electronic device.

Moreover, the second computer system may include: an active-directory server, an AAA server, a lightweight directory access protocol (LDAP) server, a remote authentication dial-in user service (RADIUS) server, or a terminal access controller access control system plus (TACACS+) server, and/or another computer or server that provide authentication and/or authorization services.

Furthermore, communication between the electronic device and the computer system and/or the computer system and the second computer system may use transport layer security (TLS).

Additionally, after receiving the authorization response, the computer system may determine a mapping to a partner domain administrator of the electronic device based at least in part on an active-directory group, an LDAP group or a vendor specific attribute (VSA) specified in the authorization response, and the information in the access response may specify the partner domain administrator. In some embodiments, the computer system notifies a single-sign-on (SSO) manager about the mapping to the partner domain administrator.

Note that the MSP and the tenant may be associated with different entities.

Another embodiment provides a computer-readable storage medium with program instructions for use with the computer system. When executed by the computer system, the program instructions cause the computer system to perform at least some of the aforementioned operations in one or more of the preceding embodiments.

Another embodiment provides a method, which may be performed by the computer system. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
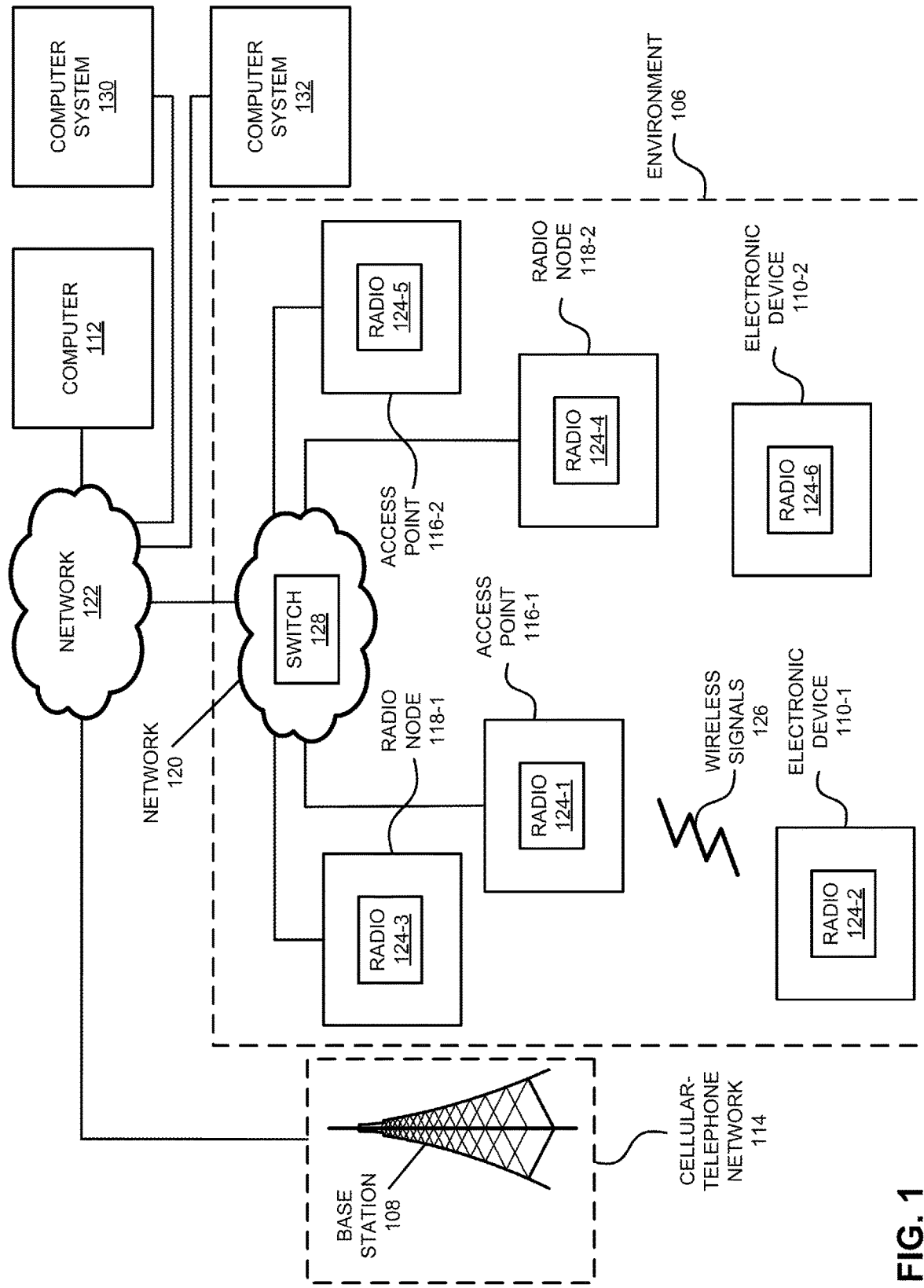
FIG. 1 is a block diagram illustrating an example of communication among electronic devices in accordance with an embodiment of the present disclosure.

During operation, a computer system may receive, from an electronic device, an access request to access a shared network in a multi-tenant system, where the electronic device associated with a tenant in the multi-tenant system. Then, the computer system may identify the second computer system, which may be associated with an MSP of the shared network and that provides authentication and/or authorization to the shared network for users associated with the tenant. Note that the MSP may be different from the tenant. Moreover, the computer system may provide, to the second computer system, an authorization request for the electronic device. Next, the computer system may receive, from the second computer system, an authorization response, where the authorization response approves access by the electronic device to the shared network. Furthermore, the computer system may provide, to the electronic device, an access response, where the access response includes information specifying access privileges of the electronic device in the shared network.

By identifying and providing the authorization request, these communication techniques may allow infrastructure associated with the MSP to provide authentication and/or authorization services to the tenant and/or its users. For example, the computer system may include: an active-directory server, an AAA server, an LDAP server, a RADIUS server, and/or a TACACS+ server. Therefore, the communication techniques may allow the MSP to provide access protection to tenants that do not have their own AAA server or similar capabilities. Consequently, the communication techniques may allow the MSP to provide services to a broader class or group of customers, partners or tenants. These capabilities may allow the MSP to provide better services and/or an improved user experience when using the shared network.

In the discussion that follows, electronic devices or components in a system communicate packets in accordance with a wireless communication protocol, such as: a wireless communication protocol that is compatible with an IEEE 802.11 standard (which is sometimes referred to as from the 'Wi-Fi®,' Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer 112 (which may be a local or a cloud-based controller that manages and/or configures access points 116, radio nodes 118 and/or switch 128, or that provides cloud-based storage and/or analytical services), computer system 130 (which may include one or more intermediary computers) and/or computer system 132 (which may provide authentication and/or authorization services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 5:
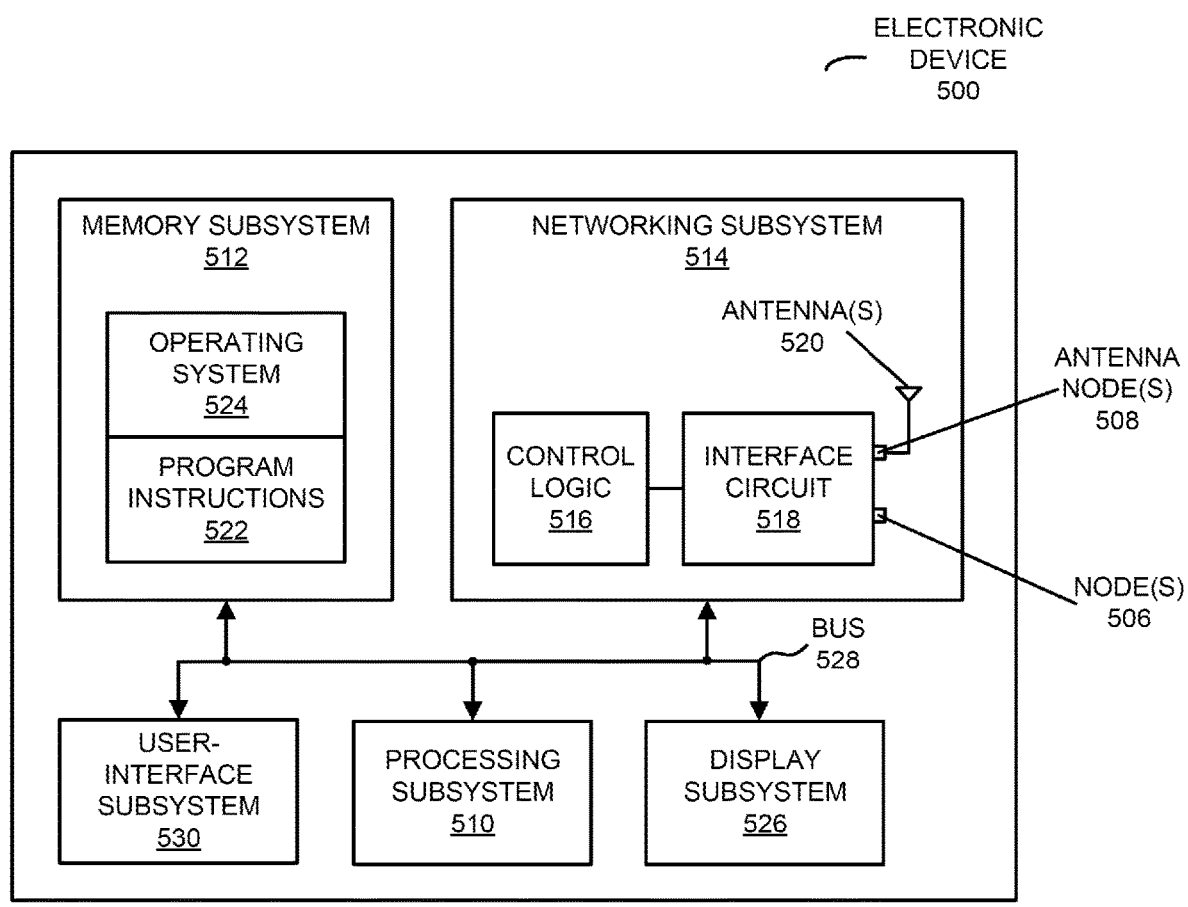
FIG. 5 is a block diagram illustrating an example of an electronic device in accordance with an embodiment of the present disclosure.

As described further below with reference to FIG. 5, electronic devices 110, computer 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use orthogonal frequency division multiplexing (OFDM) and/or multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, in order to provide protected access to a WLAN, network 120 and/or network 122, computer system 130 may enable of facilitate authentication and/or authorization of an electronic device (such as electronic device 110-1) to a shared network (such as a WLAN, network 120 and/or network 122) in a multi-tenant system, when electronic device 110-1 is associated with a tenant in the multi-tenant system that does not have its own external authentication and/or authorization services.

Figure 2:
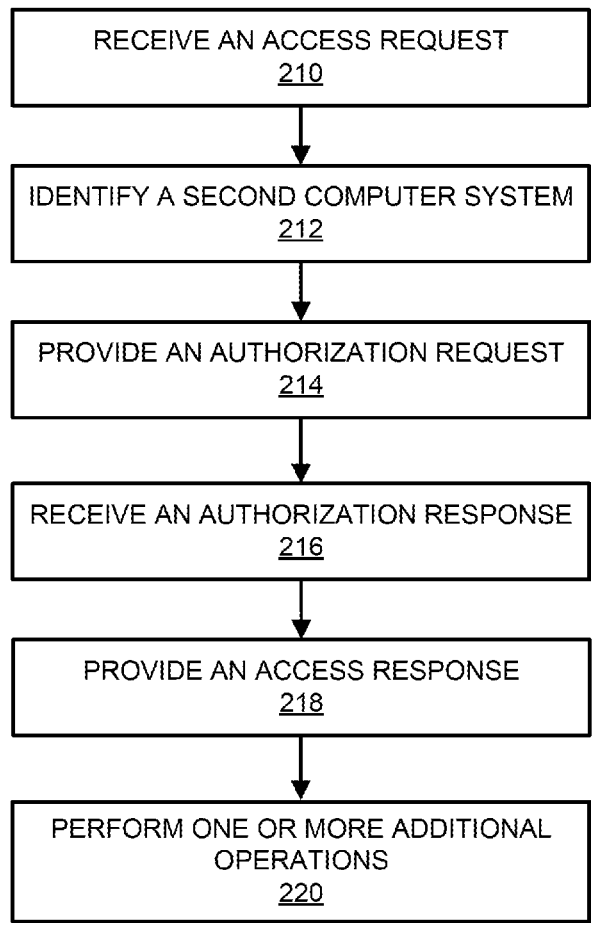
FIG. 2 is a flow diagram illustrating an example of a method for providing an authorization request using a computer system in FIG. 1 in accordance with an embodiment of the present disclosure.

Notably, as described further below with reference to FIGS. 2-4, electronic device 110-1 may provide, to computer system 130 (e.g., via access point 116-1), an access request to access the shared network. After receiving the access request, computer system 130 may identify computer system 132, which is associated with an MSP of a shared network in the multi-tenant system, where the MSP is different from the tenant, and the MSP provides authentication and/or authorization to the shared network for users associated with the tenant (such as a user of electronic device 110-1). For example, based at least in part on an identifier of electronic device 110-1 and/or an identifier of a user of electronic device 110-1 in the access request (such as a media access control or MAC address, an Internet protocol or IP address), computer system 130 may perform a look-up operation using a look-up table stored in memory with predefined identifiers and associated computer system(s) that provide authentication and/or authorization services. Alternatively or additionally, the access request may be received at an email address corresponding to a domain or domain name, and computer system 130 may perform a look-up operation using a look-up table stored in memory with predefined domain names or types of domain names and associated computer system(s) that provide authentication and/or authorization services. Note that the MSP and the tenant may be associated with associated with different entities (such as different organizations or companies). In some embodiments, computer system 132 may include: an active-directory server, an AAA server, an LDAP server, a RADIUS server, a TACACS+ server, and/or another computer or server that provide authentication and/or authorization services.

Moreover, computer system 130 may provide, to computer system 132, an authorization request for electronic device 110-1. After receiving the authorization request, computer system 132 may perform authentication and/or authorization of electronic device 110-1 and/or a user of electronic device 110-1. For example, the access request and the authorization request may include login credentials (such as a username and a password) of the user of electronic device 110-1, and computer system 132 may perform the authentication and/or authorization based at least in part on the login credentials. Alternatively or additionally, the authorization request may include the identifier of electronic device 110-1 and/or the identifier of the user of electronic device 110-1, and the authentication and/or authorization may be based at least in part on either or both of the identifiers. In some embodiments, the authorization request may include a tenant identifier of the tenant associated with electronic device 110-1 and/or the user of electronic device 110-1, and the authorization request may include may be based at least in part on the tenant identifier. Note that the authentication and/or authorization may include accessing a stored active-directory in computer system 132 to determine whether electronic device 110-1 and/or the user of electronic device 110-1 is authorized to access the WLAN, network 120 and/or network 122, and what the permissions or privileges of the user and/or electronic device 110-1.

Next, computer system 132 may provide, to computer system 130, an authorization response, where the authorization response approves access by electronic device 110-1 to the shared network. After receiving the authorization response, computer system 130 may provide, to electronic device 110-1 (e.g., via access point 116-1), an access response, where the access response includes information specifying access privileges of electronic device 110-1 in the shared network.

In some embodiments, after receiving the authorization response, computer system 130 may determine a mapping to a partner domain administrator of electronic device 110-1 based at least in part on an active-directory group, an LDAP group or a VSA specified in the authorization response, and the information in the access response may specify the partner domain administrator. In some embodiments, computer system 130 notifies an SSO manager (not shown) about the mapping to the partner domain administrator. Thus, computer system 130 may be a default intermediary computer system for electronic device 110-1 during a first access attempt to the WLAN, network 120 and/or network 122. However, after successful authentication and/or authorization by computer system 132, computer system 130 may transfer login responsibility to the SSO manager and may alert electronic device 110-1 to the change, so that electronic device 110-1 can address a subsequent instance of the access request to the SSO manager.

In these ways, the communication techniques may allow electronic device 110-1 to securely access the WLAN, network 120 and/or network 122, even though the tenant associated with electronic device 110-1 does not have its own external authentication and/or authorization service. Therefore, the communication techniques may allow the MSP to expand its services to include customers or partners, such as the tenant. Consequently, the communication techniques may improve the user experience when using a WLAN (which may include access points 116 and/or radio nodes 118), network 120 and/or network 122.

While FIG. 1 illustrates computer 112 and computer system 130 as being separate components, in some embodiments some or all of the functionality of computer 112 and computer system 130 may be combined into a single component or computer system.

We now describe embodiments of the method. FIG. 2 presents a flow diagram illustrating an example of a method 200 for providing an authorization request, which may be performed by one or more computers in a computer system, such as computer system 130. During operation, the computer system may receive, from an electronic device, an access request (operation 210) to access a shared network in a multi-tenant system, where the electronic device associated with a tenant in the multi-tenant system. Then, the computer system may identify a second computer system (operation 212), which is associated with an MSP of a shared network in the multi-tenant system, where the MSP is different from the tenant (e.g., the MSP and the tenant may be associated with different entities), and the MSP provides authentication and authorization to the shared network for users associated with the tenant. Moreover, the computer system may provide, to the second computer system, the authorization request (operation 214) for the electronic device. Next, the computer system may receive, from the second computer system, an authorization response (operation 216), where the authorization response approves access by the electronic device to the shared network. Furthermore, the computer system may provide, to the electronic device, an access response (operation 218), where the access response includes information specifying access privileges of the electronic device in the shared network.

Note that the access request and the authorization request may include login credentials of the electronic device or a user of the electronic device. Moreover, the second computer system may include: an active-directory server, an AAA server, an LDAP server, a RADIUS server, a TACACS+ server, and/or another computer or server that provide authentication and/or authorization services. Furthermore, communication between the electronic device and the computer system and/or the computer system and the second computer system may use TLS.

In some embodiments, the computer system optionally performs one or more additional operations (operation 220). Notably, after receiving the authorization response (operation 216), the computer system may determine a mapping to a partner domain administrator of the electronic device based at least in part on an active-directory group, an LDAP group or a VSA specified in the authorization response, and the information in the access response may specify the partner domain administrator. In some embodiments, the computer system notifies an SSO manager about the mapping to the partner domain administrator.

In some embodiments of method 200, there may be additional or fewer operations. Furthermore, the order of the operations may be changed, and/or two or more operations may be combined into a single operation.

Figure 3:
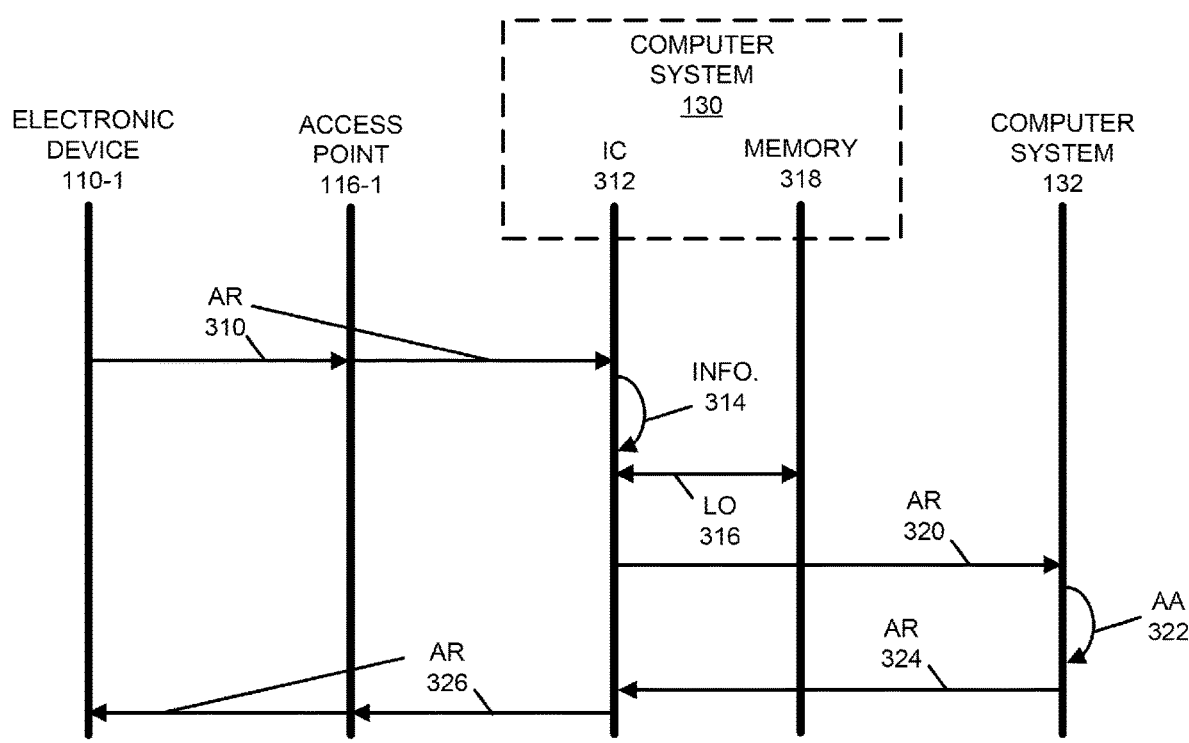
FIG. 3 is a drawing illustrating an example of communication among an electronic device and an access point in FIG. 1 in accordance with an embodiment of the present disclosure.

Embodiments of the communication techniques are further illustrated in FIG. 3, which presents a drawing illustrating an example of communication among electronic device 110-1, access point 116-1, computer system 130 and computer system 132. Note that computer system 130 and/or computer system 132 may include one or more computers at the same or at different locations. In FIG. 3, electronic device 110-1 may provide, to access point 116-1, an access request (AR) 310 to access a shared network in a multi-tenant system, which forwards access request 310 to computer system 130.

After receiving access request 310, an interface circuit (IC) 312 in computer system 130 may identify computer system 132. For example, based at least in part on information 314 included in or associated with access request 310, interface circuit may perform a look-up operation (LO) 316 in memory 318 in computer system 130. Then, interface circuit 312 may provide, to computer system 132, an authorization request (AR) 320 for electronic device 110-1.

Moreover, after receiving authorization request 320, computer system 132 may perform authentication and/or authorization (AA) 322 of electronic device 110-1 and/or a user of electronic device 110-1. Next, computer system 132 may provide, to computer system 130, an authorization response (AR) 324, where authorization response 324 approves access by electronic device 110-1 to the shared network.

Furthermore, interface circuit 312 may receive authorization response 324. In response, interface circuit 312 may provide, to electronic device 110-1 via access point 116-1, an access response (AR) 326, where access response 326 includes information specifying access privileges of electronic device 110-1 in the shared network.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe embodiments of the communication techniques. The disclosed communication techniques allow one or more tenants to login to a network via authentication and/or authorization servers associated with a service provider and to be granted proper privileges. In a multi-tenant system, a tenant and their service provider should have their own resources in the multi-tenant system with proper access protection, so that every authenticated tenant will be authorized via, e.g., role-based control access (RBAC) to let them manipulate their data correctly. Typically, the authentication and/or authorization are performed by one or more external AAA servers. However, when a tenant does not have their own AAA server, it can be difficult for them to use the AAA server associated with their service provider for authentication and/or authorization. This problem is addressed by the communication techniques, which allow a tenant to be authenticated and/or authorized by the AAA server associated with their service provider, and which provide another way to let the service provide manage the tenant via the AAA server.

Figure 4:
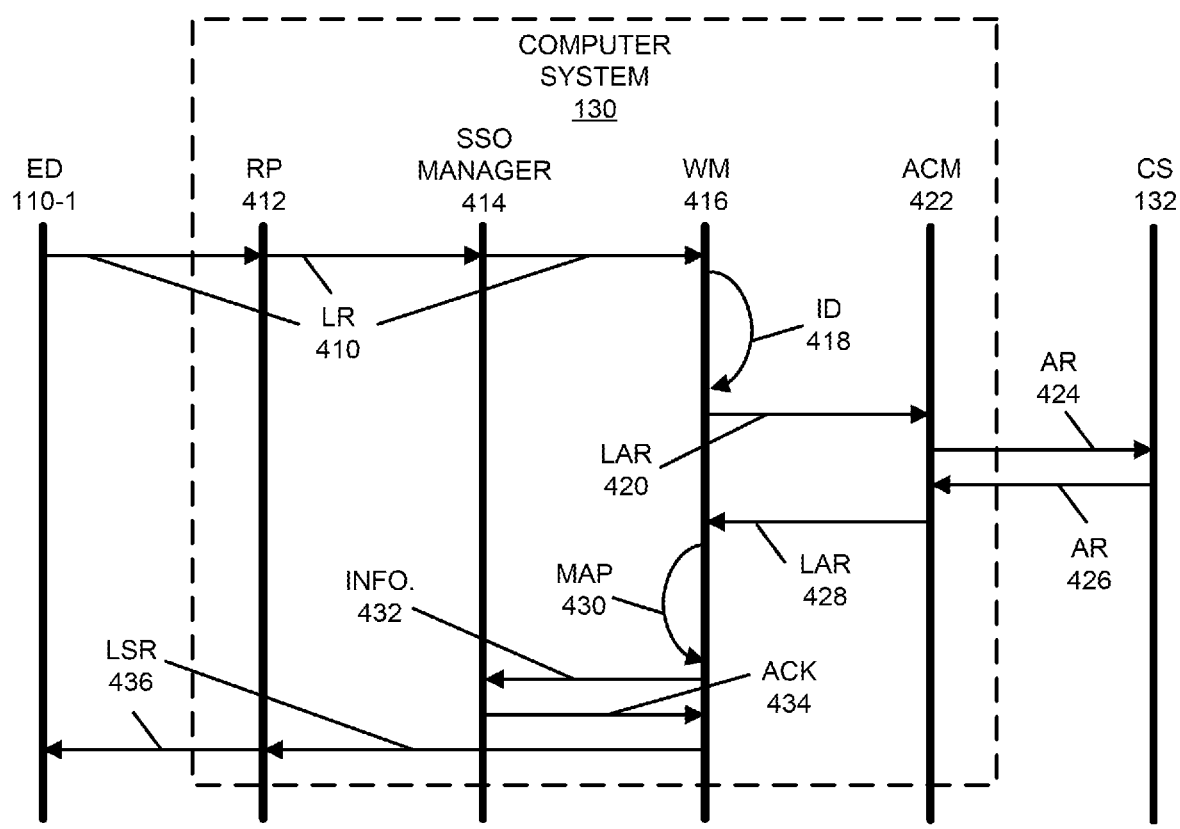
FIG. 4 is a drawing illustrating an example of enabling authentication and/or authorization of an electronic device to a shared network in a multi-tenant system in accordance with an embodiment of the present disclosure.

FIG. 4 presents a drawing illustrating an example of enabling or facilitating authentication and/or authorization of an electronic device to a shared network in a multi-tenant system. Notably, a user of electronic device (ED) 110-1 may provide a login request (LR) 410 with active-directory credentials, LDAP credentials, RADIUS credentials, or TACACS+ credentials via a reverse proxy or RP 412 (which may retrieve resources on behalf of a client), an SSO manager 414, and a web module (WM) 416 in computer system 130 that provides network management service (NMS). Web module 416 may identify (ID) 418 or find out a target authorization server or computer system (such as computer system or CS 132) based at least in part on the login input. Then, web module 416 may provide a local authentication request (LAR) 420 to an authentication control module (ACM) 422, which may provide an authentication request or AR 424 (such as an active-directory authentication request, an LDAP authentication request, a RADIUS authentication request, or a TACACS+ authentication request) to an external server or computer system 132.

In some embodiments, the external server or computer system 132 includes: an external active-directory server, an external LDAP server, an external RADIUS sever (which may implement a RADSEC protocol), or an external TACACS+ server. For example, the bound active-directory group specified by the active-directory authentication request may determine an NMS domain and an administrator for the user. Alternatively, the bound LDAP common-name groups specified by the LDAP authentication request may determine an NMS domain and an administrator for the user. Moreover, a VSA and user information specified by the RADIUS authentication request may determine an NMS domain and an administrator for the user. In some embodiments, a username attribute specified by the TACACS+ authentication request may determine an NMS domain and an administrator for the user.

Then, the external server or computer 132 may provide an authentication response (AR) 426 (such as an active-directory authentication response, an LDAP authentication response, a RADIUS authentication response, or a TACACS+ authentication response) to the authentication control module 422, which may provide a local authentication response (LAR) 428 to web module 416. Moreover, web module 416 may map 430 the NMS system domain to a partner domain administrator based at least in part on the active-directory groups, the LDAP common-name groups, the VSA, or the username in authentication response 426 and/or information included in authentication response 426. Information 432 specifying this mapping to the administrator may be provided to SSO manager 414, which may provide an acknowledgment 434.

Next, web module 416 may provide a login success response (LSR) 436 to electronic device 110-1 via reverse proxy 412. This login success response may specify privileges of electronic device 110-1 in the accessed network.

For example, a tenant login system may be provided via an active-directory server of a service provider. In some embodiments, TLS may also be supported. The tenant may login with 'tenant_ad_account@ad_realm.' Computer system 130 may identify the correct active-directory server based at least in part on 'ad_realm.' Then, the computer system may provide an active-directory authentication request to the external active-directory server. Next, computer system 130 may receive an active-directory authentication response. Moreover, computer system 130 may check the VSA and/or the active-directory groups, and may exchange it with the current role of computer system 130. Moreover, the tenant may then be able to login successfully with proper privileges.

Alternatively, a tenant login system may be provided via an LDAP or an LDAPS (which is an encrypted LDAP protocol) server of a service provider. The tenant may login with 'tenant_ldap_account@ldap_realm.' Computer system 130 may identify the correct LDAP or LDAPS server based at least in part on 'ldap_realm.' Then, computer system 130 may provide an LDAP or LDAPS authentication request to the external LDAP or LDAPS server. Next, computer system 130 may receive an LDAP or LDAPS authentication response. Moreover, computer system 130 may check the VSA and/or the LDAP or LDAPS groups, and may exchange it with the current role of computer system 130. Moreover, the tenant may then be able to login successfully with proper privileges.

Furthermore, a tenant login system may be provided via a RADIUS server of a service provider. The tenant may login with 'tenant_radius_account@radius_realm.' Computer system 130 may identify the correct RADIUS server based at least in part on 'radius_realm.' Then, computer system 130 may provide a RADIUS authentication request to the external RADIUS server. Next, computer system 130 may receive a RADIUS authentication response. Moreover, computer system 130 may check the VSA and may exchange it with the current role of computer system 130. Moreover, the tenant may then be able to login successfully with proper privileges.

In some embodiments, a tenant login system may be provided via a TACACS+ server of a service provider. The tenant may login with 'tenant_tacacs_account@tacacs_realm.' Computer system 130 may identify the correct TACACS+ server based at least in part on 'tacacs_realm.' Then, computer system 130 may provide a TACACS+ authentication request to the external TACACS+ server. Next, computer system 130 may receive a TACACS+ authentication response. Moreover, computer system 130 may check the VSA and/or the username and may exchange it with the current role of computer system 130. Moreover, the tenant may then be able to login successfully with proper privileges.

We now describe embodiments of an electronic device, which may perform at least some of the operations in the communication techniques. FIG. 5 presents a block diagram illustrating an example of an electronic device 500 in accordance with some embodiments, such as one of: base station 108, one of electronic devices 110, computer 112, one of access points 116, one of radio nodes 118, switch 128, a computer in computer system 130 or a computer in computer system 132. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include DRAM, static random access memory (SRAM), and/or other types of memory. In some embodiments, instructions for processing subsystem 510 in memory subsystem 512 include: one or more program modules or sets of instructions (such as program instructions 522 or operating system 524, such as Linux, UNIX, Windows Server, or another customized and proprietary operating system), which may be executed by processing subsystem 510. Note that the one or more computer programs, program modules or instructions may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520 (or antenna elements). (While FIG. 5 includes one or more antennas 520, in some embodiments electronic device 500 includes one or more nodes, such as antenna nodes 508, e.g., a metal pad or a connector, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a networking system), an Ethernet networking system, and/or another networking system.

Note that a transmit or receive antenna pattern (or antenna radiation pattern) of electronic device 500 may be adapted or changed using pattern shapers (such as directors or reflectors) and/or one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Moreover, electronic device 500 may include a user-interface subsystem 530, such as: a mouse, a keyboard, a trackpad, a stylus, a voice-recognition interface, and/or another human-machine interface. In some embodiments, user-interface subsystem 530 may include or may interact with a touch-sensitive display in display subsystem 526.

Electronic device 500 can be (or can be included in) any electronic device with at least one network interface. For example, electronic device 500 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments instructions 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514 and/or of electronic device 500. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 522, operating system 524 (such as a driver for interface circuit 518) or in firmware in interface circuit 518. Alternatively or additionally, at least some of the operations in the communication techniques may be implemented in a physical layer, such as hardware in interface circuit 518.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
an interface circuit configured to communicate with an electronic device associated with a tenant in a multi-tenant system, and with a second computer system associated with a managed service provider (MSP) of a shared network in the multi-tenant system, wherein the MSP is different from the tenant, and wherein the computer system is configured to:
receive, associated with the electronic device, an access request to access the shared network;
identify the second computer system, which provides authentication and authorization to the shared network for users associated with the tenant;
provide, addressed to the second computer system, an authorization request for the electronic device;
receive, associated with the second computer system, an authorization response, wherein the authorization response approves access by the electronic device to the shared network;
determine a mapping to a partner domain administrator of the electronic device based at least in part on a lightweight directory access protocol (LDAP) group or a vendor specific attribute (VSA) specified in the authorization response; and
provide, addressed to the electronic device, an access response, wherein the access response comprises information specifying access privileges of the electronic device in the shared network and the partner domain administrator.

2. The computer system of claim 1, wherein the access request and the authorization request comprise login credentials of the electronic device or a user of the electronic device.

3. The computer system of claim 1, wherein the second computer system comprises: an active-directory server, an authentication, authorization and accounting (AAA) server, a LDAP server, a remote authentication dial-in user service (RADIUS) server, or a terminal access controller access control system plus (TACACS+) server.

4. The computer system of claim 1, wherein communication between the electronic device and the computer system, the computer system and the second computer system, or both uses transport layer security (TLS).

5. The computer system of claim 1, wherein the computer system is configured to notify a single-sign-on (SSO) manager about the mapping to the partner domain administrator.

6. The computer system of claim 1, wherein the MSP and the tenant are associated with different entities.

7. A non-transitory computer-readable storage medium for use in conjunction with a computer system, the computer-readable storage medium storing program instructions that, when executed by the computer system, cause the computer system to perform operations comprising:
receiving, from an electronic device, an access request to access a shared network in a multi-tenant system, wherein the electronic device associated with a tenant in the multi-tenant system;
identifying a second computer system, which is associated with a managed service provider (MSP) of a shared network in the multi-tenant system, wherein the MSP is different from the tenant, and the MSP provides authentication and authorization to the shared network for users associated with the tenant;
providing, to the second computer system, an authorization request for the electronic device;
receiving, from the second computer system, an authorization response, wherein the authorization response approves access by the electronic device to the shared network; and
determining a mapping to a partner domain administrator of the electronic device based at least in part on a lightweight directory access protocol (LDAP) group or a vendor specific attribute (VSA) specified in the authorization response;
providing, to the electronic device, an access response, wherein the access response comprises information specifying access privileges of the electronic device in the shared network and the partner domain administrator.

8. The non-transitory computer-readable storage medium of claim 7, wherein the access request and the authorization request comprise login credentials of the electronic device or a user of the electronic device.

9. The non-transitory computer-readable storage medium of claim 7, wherein the second computer system comprises: an active-directory server, an authentication, authorization and accounting (AAA) server, a LDAP server, a remote authentication dial-in user service (RADIUS) server, or a terminal access controller access control system plus (TACACS+) server.

10. The non-transitory computer-readable storage medium of claim 7, wherein communication between the electronic device and the computer system, the computer system and the second computer system, or both uses transport layer security (TLS).

11. The non-transitory computer-readable storage medium of claim 7, wherein the operations notifying a single-sign-on (SSO) manager about the mapping to the partner domain administrator.

12. A method for providing an authorization request, comprising:
by a computer system:
receiving, from an electronic device, an access request to access a shared network in a multi-tenant system, wherein the electronic device associated with a tenant in the multi-tenant system;
identifying a second computer system, which is associated with a managed service provider (MSP) of a shared network in the multi-tenant system, wherein the MSP is different from the tenant, and the MSP provides authentication and authorization to the shared network for users associated with the tenant;
providing, to the second computer system, the authorization request for the electronic device;
receiving, from the second computer system, an authorization response, wherein the authorization response approves access by the electronic device to the shared network; and
determining a mapping to a partner domain administrator of the electronic device based at least in part on a lightweight directory access protocol (LDAP) group or a vendor specific attribute (VSA) specified in the authorization response;
providing, to the electronic device, an access response, wherein the access response comprises information specifying access privileges of the electronic device in the shared network and the partner domain administrator.

13. The method of claim 12, wherein the access request and the authorization request comprise login credentials of the electronic device or a user of the electronic device.

14. The method of claim 12, wherein the second computer system comprises: an active-directory server, an authentication, authorization and accounting (AAA) server, a LDAP server, a remote authentication dial-in user service (RADIUS) server, or a terminal access controller access control system plus (TACACS+) server.

15. The method of claim 12, wherein communication between the electronic device and the computer system, the computer system and the second computer system, or both uses transport layer security (TLS).

16. The method of claim 12, wherein the method comprises notifying a single-sign-on (SSO) manager about the mapping to the partner domain administrator.

17. The method of claim 12, wherein the MSP and the tenant are associated with different entities.

* * * * *